Figure 1:
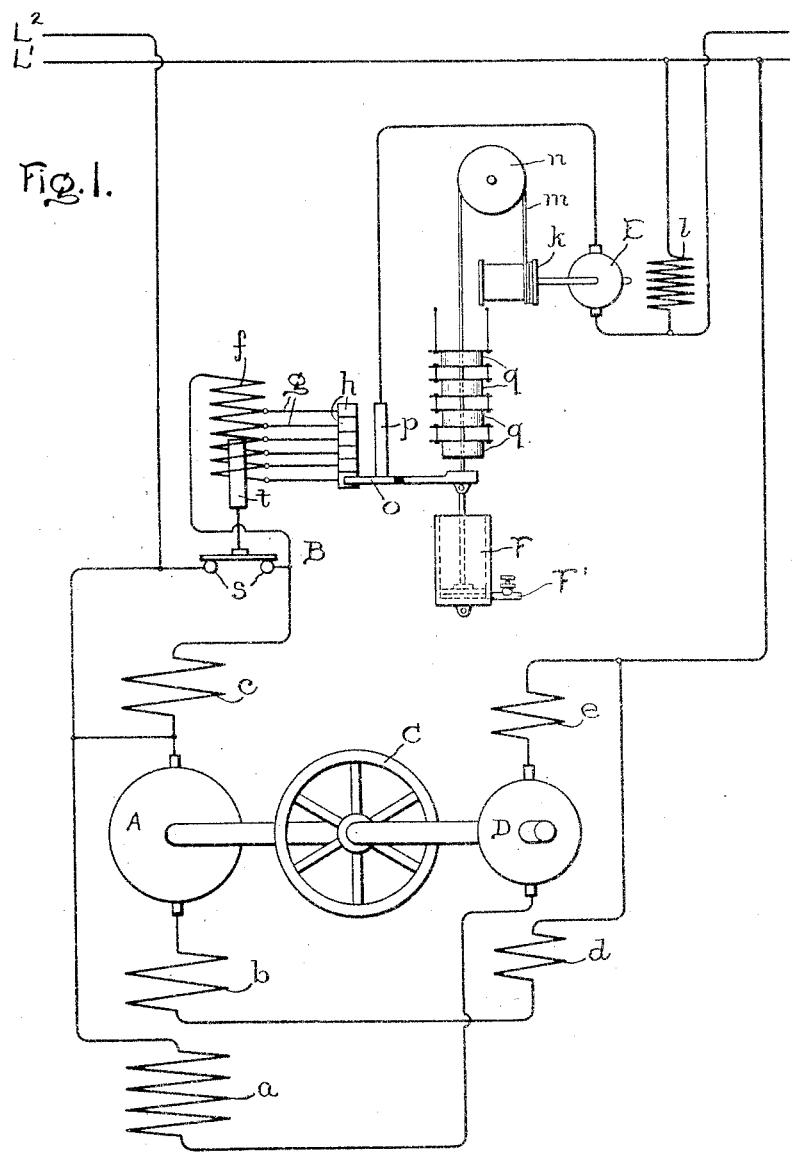

J. A. SEEDE.
MOTOR CONTROL SYSTEM.
APPLICATION FILED OCT. 27, 1908.

1,027,159.

Patented May 21, 1912.

Witnesses:

Inventor:
John A. Seede,
by
Att'y

UNITED STATES PATENT OFFICE.

JOHN A. SEEDE, OF SCHENECTADY, NEW YORK, ASSIGNOR TO GENERAL ELECTRIC COMPANY, A CORPORATION OF NEW YORK.

MOTOR-CONTROL SYSTEM.

1,027,159.  Specification of Letters Patent.  Patented May 21, 1912.

Application filed October 27, 1908. Serial No. 459,675.

*To all whom it may concern:*

Be it known that I, JOHN A. SEEDE, a citizen of the United States, residing at Schenectady, in the county of Schenectady, State of New York, have invented certain new and useful Improvements in Motor-Control Systems, of which the following is a specification.

My invention relates to motor control systems and more particularly to such a system in which a motor coupled to a flywheel is employed.

As is well known, flywheel motors or flywheel motor generator sets have been used in motor control systems in which the power required at the load end of the system varies between wide limits. Such sets are used to limit the amount of power demanded from the source of supply upon the occurrence of momentary overloads, the flywheel taking power from the source when the system is lightly loaded and restoring its stored energy upon the occurrence of an overload; thus the power taken from the supply lines remains practically constant and equals the average value of the load upon the system. In order that the flywheel may give up its energy it is necessary that the field strength of the motor coupled thereto be varied. This variation of the field strength of the motor is often obtained by automatic means. In some systems the average value of the load changes during the operation of the system and then it becomes necessary to change the adjustment of the means for varying the field strength of the motor so that it will still operate with this different average value of the load. According to my invention I change this adjustment automatically.

In another aspect, my invention consists in the combination of a power circuit, a dynamo-electric machine, a regulating device therefor, a torque motor in said circuit arranged to operate said device, the torque of said motor varying with the load on said circuit, and means for changing the counter torque of said torque motor, as said torque motor rotates in response to changes in the average value of the load upon the circuit.

In another aspect, my invention consists in a system of motor control comprising a power circuit, a motor coupled to a flywheel, an electrically operated device for automatically varying the field strength of said motor, and means responsive to the current in the power circuit supplying the system for automatically controlling said electrically operated device to change its adjustment in proportion to the average value of the load upon said system.

In a still narrower aspect, my invention consists in a system of motor control comprising a power circuit, a motor coupled to a flywheel, a relay for automatically varying the field strength of said motor, the coil of said relay being provided with taps, and a "torque" motor in said circuit arranged to connect the power circuit of the system to successive taps of said coil depending upon the average load upon the system.

Other features of my invention are pointed out with particularity in the claims annexed to and forming a part of this specification. For a better understanding of my invention however, reference may be had to the following description taken in connection with the accompanying drawing in which—

Figure 2:
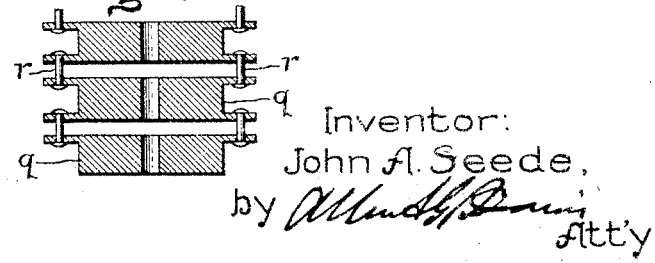

Figure 1 shows diagrammatically a system arranged in accordance with my invention, and Fig. 2 shows a detail of construction.

Referring to the drawing, A is a flywheel motor coupled to a flywheel C. The field strength of motor A is automatically varied by a regulating device. I have preferred to show such a device for cutting in and out the field winding $c$ by means of an electrically operated device, which is preferably a relay B. This relay B is arranged to be automatically controlled to change its adjustment in proportion to the average value of the load upon the system, as will hereafter appear. The insertion of the winding $c$ alone would make the motor A develop an excessive voltage and I, therefore, have provided means for decreasing the resultant field of motor A so that when the motor A acts as a generator its voltage does not become excessive. These means are arranged to reduce their effect as the speed of the motor A falls. These means consists of a small generator D, which is preferably mounted on the same shaft with the flywheel C and motor A, although they may be coupled together in any well known manner.

The motor A has a shunt field winding $a$, a cumulative series winding $b$, when machine A is acting as a motor, and a winding $c$ which is preferably a winding in series with the load. The winding $c$ is only connected in circuit when the machine A acts as a generator, and when so connected in circuit produces a field which is in the same direction as the field produced by the shunt winding $a$, but is opposed to the field produced by the series winding $b$ under these conditions.

The generator D has a field winding $d$ which is in series with the armature A of the flywheel motor, and also a field winding $e$. The winding $e$, the armature of generator D, and the winding $a$ of the motor are all in series. This winding $e$, being in series with the shunt winding $a$, always produces a field in the same direction which assists the field produced by winding $d$ when machine A is acting as a motor and opposes the field produced by winding $d$, when the machine A acts as a generator. The winding $e$ has a small number of ampere turns in proportion to winding $d$.

The relay B has an actuating coil $f$ in series with one of the supply lines, and is situated between the flywheel motor and the load. The coil $f$ is provided with taps $g$, connected to segments $h$. The "torque" motor E has its armature in series with the actuating coil of the relay and is arranged to turn the drum $k$. I have shown the motor E with a shunt winding $l$, but it is evident that this field winding may be connected in the circuit in any other well known manner. The flexible cord $m$ is wound about the drum $k$, to which one end is attached, passes over the pulley $n$ and has its other end attached to the arm $o$. This arm is arranged to connect the segments $h$ to the contact $p$. The dash-pot F is attached to the arm $o$ and prevents too rapid fluctuations thereof. The cylinder of the dash pot is provided with a stop cock $F^1$ by which the operation of the dash pot is regulated. When the current passing through the armature of motor E exerts a torque sufficient to turn the motor, it rotates the drum $k$, winds the cord $m$ about it and lifts the arm $o$. As the arm moves upward, different taps of the winding of the relay are connected to the contact $p$, leaving less of the coil $f$ in series with the line. However, as it moves upward it engages the first of the weights $q$, which adds to the counter torque of the motor E. As each segment $h$ is passed a new weight is added, and in order to overcome the increased counter torque, a greater amount of current must pass through the armature of motor E. Fig. 2 shows the method of connecting the weights $q$ together by means of rivets $r$, so that they may be lifted up one at a time by the arm $o$.

Current is supplied to the lines $L^1$ and $L^2$ from some suitable source of direct current. When the conditions of the system are such that the average value of the current taken by the load is not sufficient to turn the torque motor E, then the whole coil $f$ of the relay is in circuit. If the load is below this average value, sufficient current does not flow through the actuating coil of the relay to make it pull up, the machine A runs light across the lines as a motor, the total load being supplied from the lines $L^1$ and $L^2$. The relay B is in the position shown in the drawings, the contacts $s$, being closed, and therefore the field winding $c$ is short circuited. Since the flywheel motor is running light it takes a small current from the lines, consequently, a small current flows through the field winding $d$, and the voltage generated by machine D is small but in such a direction as to increase the impressed voltage across the field winding $a$ and therefore, increase the strength of the field produced by this winding. If the load is suddenly increased above this average value, a heavy current flows through the lines $L_1$ and $L_2$, and through the actuating coil $f$ of the relay, the armature $t$ of which pulls up, opens the circuit across the contacts $s$, which inserts the winding $c$ in series with line $L^2$ and the load. The insertion of this winding increases the field strength of the motor, tends to slow it down, or in other words, increases its counter electromotive force; the flywheel, however, tends to keep the speed up and delivers some of its stored energy to the machine A, which now tends to act as a generator and return energy to the line, the current through its armature being reversed. The insertion of this winding $c$ alone would make the machine develop a very high voltage which would probably injure it. As soon as the machine A starts to act as a generator, however, the field winding $b$ produces a flux which opposes that produced by the windings $a$ and $c$, and thus reduces the voltage of machine A. The direction of the current in the field winding $d$ is also reversed, thereby reversing the polarity of machine D, the voltage thereof now reduces that applied to the shunt winding $a$ and still further reduces the resultant flux of machine A. As the overload continues, the flywheel motor gradually falls in speed and the voltage generated by the motor tends to decrease, necessitating an increase in its excitation. In order to increase the excitation of machine A, the field winding $e$ is provided, which has practically a constant excitation and under these conditions produces a flux opposed to that produced by winding $d$, so that the effect of the voltage produced by machine D gradually decreases as its speed falls, the field winding $a$ has a greater voltage applied across its terminals and the flux produced by it increases, thus tending to keep up the voltage of machine A. When the overload has ceased, the armature of the relay drops short-circuiting the winding $c$, the current reverses through the armature of the motor and it speeds up to normal speed as a cumulative compound motor without taking an excess current from the line.

If during the operation of my system the current taken by the load is increased, the current flowing through the armature of motor E increases. If this increased current persists for any length of time, the motor E will revolve the drum $h$ and move the arm $o$ up to the next tap on the coil of the relay, cutting out a portion of the coil. The presence of the dash pot F prevents this occurring with the ordinary load fluctuations which actuate the relay B, the motor E does not operate until the average value of the load has increased. When the relay has a portion of the coil cut out a correspondingly greater flow of current is necessary to make its armature $l$ pull up. It will, therefore, be seen that with every increase in the average value of the load, my system will automatically adjust the relay B, and the fly wheel motor A will operate as explained above when the whole of the actuating coil $f$ is in series with the line $L^2$. When the average value of the load decreases more of the coil $f$ is gradually reinserted into the circuit.

While I have illustrated my invention in connection with a system having a flywheel motor, it is obvious that my invention is equally applicable to flywheel motor generator sets, nor is it limited to the specific way that I have shown for varying the field strength of the motor, and I aim in the appended claims to cover such modifications as well as any other modifications that do not involve a departure from the spirit and scope of my invention.

What I claim as new and desire to secure by Letters Patent of the United States, is—

1. In a system of motor control, a motor coupled to a flywheel, adjustable means for automatically varying the field strength of said motor, and a device for automatically controlling said means to change its adjustment in proportion to the average value of the load upon the system.

2. In a system of motor control, a power circuit, a motor, an adjustable relay for automatically varying the field strength of said motor, and means responsive to current in said circuit for automatically controlling said relay to change its adjustment.

3. In a system of motor control, a motor coupled to a flywheel, an adjustable electrically operated device for automatically varying the field strength of said motor, and means for automatically controlling said device to change its adjustment in proportion to the average value of the load upon the system.

4. In a system of motor control, a power circuit, a motor coupled to a flywheel, an adjustable electrically operated device for automatically varying the field strength of said motor, and means responsive to the current in said circuit for automatically controlling said device to change its adjustment in proportion to the average value of the load upon the system.

5. In a system of motor control, a power circuit, a motor coupled to a flywheel, an adjustable relay for automatically varying the field strength of said motor, and means responsive to current in said circuit for automatically controlling said relay to change its adjustment in proportion to the average value of the load upon said system.

6. In a system of motor control, a power circuit, a motor coupled to a flywheel, a relay for automatically varying the field strength of said motor, the coil of said relay being provided with taps, and means for automatically connecting said circuit to successive taps depending upon the average value of the load upon the system.

7. In a system of motor control, a power circuit, a motor coupled to a flywheel, a relay for automatically varying the field strength of said motor, the coil of said relay being provided with taps, and means responsive to the current in said circuit for connecting said circuit to successive taps depending upon the average value of the load upon the system.

8. In a system of motor control, a power circuit, a motor coupled to a flywheel, a relay for automatically varying the field strength of said motor, the coil of said relay being provided with taps, and a torque motor in said circuit arranged to connect said circuit to successive taps of said coil depending upon the average value of the load upon the system.

9. In a system of motor control, a power circuit, a motor coupled to a flywheel, a relay for automatically varying the field strength of said motor, the coil of said relay being provided with taps, a torque motor in said circuit arranged to connect said circuit to successive taps of said coil, and means for changing the counter torque of said torque motor depending upon the change of the average value of the load upon the system.

10. In a system of motor control, a power circuit, a motor coupled to a flywheel, a relay for automatically varying the field strength of said motor, the coil of said relay being provided with taps, a torque motor in said circuit arranged to connect said circuit to successive taps of said coil, and weights arranged to change the counter torque of said torque motor in steps, as the average value of the load upon the system changes.

11. In a system of motor control, a motor coupled to a flywheel, a field winding on said motor, adjustable means for automatically cutting said field winding into and out of circuit, and a second means for automatically controlling said first-mentioned means to change its adjustment.

12. In a system of motor control, a motor coupled to a flywheel, a field winding on said motor, adjustable electrically operated means for automatically cutting said field winding into and out of circuit, and a device for automatically controlling said means to change its adjustment in proportion to the average value of the load upon the system.

13. In a system of motor control, a power circuit, a motor coupled to a flywheel, a field winding on said motor, an adjustable relay for cutting said field winding into and out of circuit, and means responsive to current in said circuit for automatically controlling said relay to change its adjustment.

14. In a system of motor control, a power circuit, a motor coupled to a flywheel, a field winding on said motor, a relay for cutting said field winding into and out of circuit, the coils of said relay being provided with taps, and means responsive to the current in said circuit for connecting said circuit to successive taps depending upon the average value of the load upon the system.

15. In a system of motor control, a power circuit, a motor coupled to a flywheel, a field winding on said motor, a relay for cutting said field winding into and out of circuit, the coil of said relay being provided with taps, and a torque motor in said circuit arranged to connect said circuit to successive taps of said coil depending upon the average value of the load upon the system.

16. In a system of motor control, a power circuit, a motor coupled to a flywheel, a field winding on said motor, a relay for cutting said field winding into and out of circuit, the coil of said relay being provided with taps, a torque motor in said circuit arranged to connect said circuit to successive taps of said coil, and means for changing the counter torque of said torque motor depending upon the change of the average value of the load upon the system.

17. In a system of motor control, a power circuit, a motor coupled to a flywheel, a field winding on said motor, a relay for cutting said field winding into and out of circuit, the coil of said relay being provided with taps, a torque motor in said circuit arranged to connect said circuit to successive taps of said coil, and weights arranged to change the counter torque of said torque motor in steps, as the average value of the load upon the system changes.

18. In a system of motor control, a flywheel motor, a field winding on said motor, and means responsive to the load on said system for cutting said field winding into and out of circuit.

19. In a system of motor control, a flywheel motor, a field winding on said motor, and an electrically operated device for automatically cutting said field winding into and out of circuit.

20. In a system of motor control, a flywheel motor, a field winding on said motor, an electrically operated device for automatically cutting said field winding into and out of circuit, and means for decreasing the resultant field of said motor so that when said motor acts as a generator its voltage does not become excessive.

21. In a system of motor control, a flywheel motor, a field winding on said motor, means responsive to the load on said system for cutting said field winding into circuit, and means for decreasing the resultant field of said motor when said motor acts as a generator so that its voltage does not become excessive.

22. In a system of motor control, a flywheel motor, a field winding on said motor, means responsive to the load on said system for cutting said field winding into circuit, and means for decreasing the resultant field of said motor when said motor acts as a generator so that its voltage does not become excessive, said means for reducing the resultant field being arranged to reduce its own effect as said motor falls in speed.

23. In a system of motor control a flywheel motor, a field winding on said motor, means responsive to the load on said system for cutting said field winding into and out of circuit, a shunt field winding on said motor, and an exciter arranged to decrease the resultant field of said motor when said motor acts as a generator.

24. In a system of motor control, a flywheel motor, a field winding on said motor, means responsive to the load on said system for cutting said field winding into and out of circuit, a shunt field winding on said motor, and an exciter arranged in said shunt field winding circuit for decreasing the resultant field of said motor when said motor acts as a generator.

25. In a system of motor control, a flywheel motor, a field winding on said motor, means responsive to the load on said system for cutting said field winding into and out of circuit, a shunt field winding on said motor, and an exciter having its armature in series with said shunt field winding.

26. In a system of motor control, a flywheel motor, a field winding on said motor, means responsive to the load on said system for cutting said field winding into and out of circuit, a shunt field winding on said motor, and an exciter having its armature in series with said shunt field winding, said exciter being arranged to reduce the voltage supplied said shunt winding when said flywheel motor acts as a generator.

27. In a system of motor control, a flywheel motor, a field winding on said motor, means responsive to the load on said system for cutting said field winding into and out of circuit, a shunt field winding on said motor, and an exciter having its armature in series with said shunt field winding and its field winding in series with the armature of the flywheel motor, said exciter being arranged to reduce the voltage supplied said shunt winding when said motor acts as a generator.

28. In a system of motor control, a flywheel motor, a field winding on said motor, means responsive to the load on said system for cutting said field winding into and out of circuit, a series field winding on said motor, a shunt field winding also on said motor, and an exciter having its armature in series with said shunt field winding, said exciter being arranged to reduce the voltage supplied said shunt field winding when said flywheel motor acts as a generator.

29. In a system of motor control, a flywheel motor, a field winding on said motor, means responsive to the load on said system for cutting said field winding into and out of circuit, a series field winding on said motor, a shunt field winding also on said motor, and an exciter having its armature in series with said shunt field winding, said exciter and said series field being arranged to decrease the resultant field of said motor when said motor acts as a generator.

30. In a system of motor control, a flywheel motor, a field winding on said motor, means responsive to the load on said system for cutting said field winding into and out of circuit, a series field winding on said motor, a shunt field also on said motor, and an exciter having its armature in series with said shunt field winding and its field winding in series with the armature of the flywheel motor, said exciter and said series field being arranged to reduce the resultant field of said motor when said motor acts as a generator.

31. In a system of motor control, a flywheel motor, a field winding on said motor, an electrically operated device for cutting said field winding into and out of circuit, a series field winding on said motor, a shunt field winding also on said motor, and an exciter having its armature in series with said shunt field winding and its field winding in series with the armature of the flywheel motor, said exciter and said series field being arranged to reduce the resultant field of said motor when said motor acts as a generator.

32. In combination, a power circuit, a dynamo electric machine, a regulating device therefor, a torque motor in said circuit arranged to operate said device and weights arranged to change the counter-torque of said torque motor in steps as the average value of the load upon the circuit changes.

33. In combination, a power circuit, an adjustable relay therein, a torque motor in said circuit arranged to control said relay to change its adjustment, the torque of said motor varying with the load on said circuit, and means for changing the counter torque of said torque motor, as the torque motor rotates in response to changes in the average value of the load upon the circuit.

34. In combination, a power circuit, an adjustable relay therein, a torque motor in said circuit arranged to control said relay to change its adjustment, and weights arranged to change the counter-torque of said torque motor in steps as the average value of the load upon the circuit changes.

In witness whereof, I have hereunto set my hand this 26th day of October, 1908.

JOHN A. SEEDE.

Witnesses:
BENJAMIN B. HULL,
HELEN ORFORD.